United States Patent [19]
Boden et al.

[11] 3,890,019
[45] June 17, 1975

[54] MAGNETIC BEARINGS

[75] Inventors: Karl Boden, Oberteuringen; Dietrich Scheffer, Friedrichshafen, both of Germany

[73] Assignee: Padana AG, Zug, Switzerland

[22] Filed: Mar. 19, 1973

[21] Appl. No.: 342,892

[30] Foreign Application Priority Data
Mar. 20, 1972 Germany............................ 2213470

[52] U.S. Cl. ................................................. 308/10
[51] Int. Cl. ........................................... F16c 39/06
[58] Field of Search........................... 308/10; 74/5

[56] References Cited
UNITED STATES PATENTS

| | | | |
|---|---|---|---|
| 3,112,962 | 12/1963 | Lautzenhiser.......................... | 308/10 |
| 3,146,038 | 8/1964 | Lautzenhiser.......................... | 308/10 |
| 3,462,666 | 8/1969 | Martinek ................................ | 308/10 |
| 3,473,852 | 10/1969 | Lyman.................................... | 308/10 |
| 3,490,816 | 1/1970 | Lyman.................................... | 308/10 |
| 3,565,495 | 2/1971 | Lyman.................................... | 308/10 |
| 3,638,093 | 1/1972 | Ross....................................... | 308/10 |
| 3,650,581 | 3/1972 | Boden.................................... | 308/10 |
| 3,749,528 | 7/1973 | Rousseau............................... | 308/10 |

*Primary Examiner*—R. Skudy
*Attorney, Agent, or Firm*—Harness, Dickey & Pierce

[57] ABSTRACT

A magnetic bearing is provided with two, at least partly separated, flux paths; one for the magnetic field of a permanent magnet and the other for the magnetic field of an electrical winding. The electromagnetic flux path includes a ferromagnetic part having a high permeability so that the electromagnetic field can be varied with the use of a relatively low input energy to the electrical winding.

In some embodiments the two fields are superimposed upon one another in two air gaps between the bearing and the body to be supported such that the electromagnetic field is added to the permanent magnetic field in one gap, but is subtracted in the other gap.

In other embodiments both flux paths pass through the ferromagnetic part which is so dimensioned relative to the permanent magnet that the magnetic field of the latter drives the ferromagnetic part into its range of magnetic saturation. The ferromagnetic part thereby offers low reluctance to the electromagnetic field.

The invention is applicable to linear bearings, axial bearings and radial rotary bearings.

19 Claims, 13 Drawing Figures

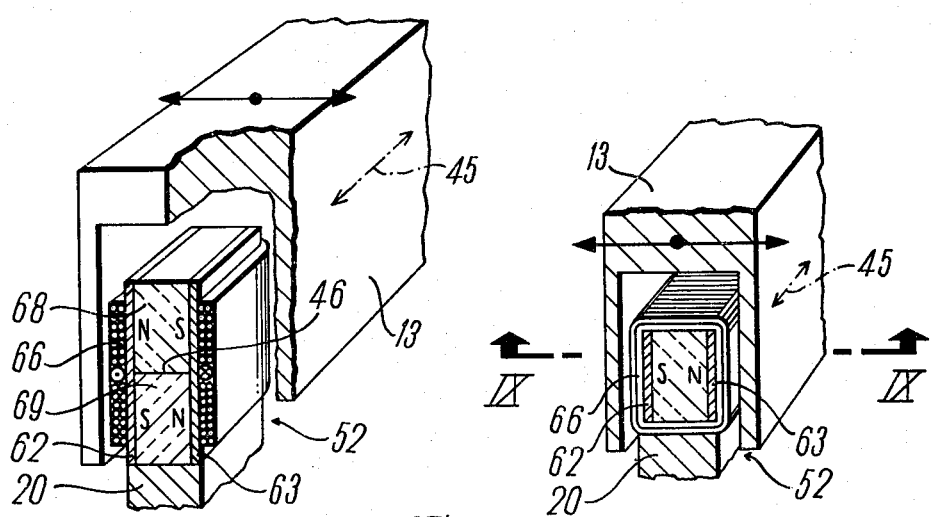
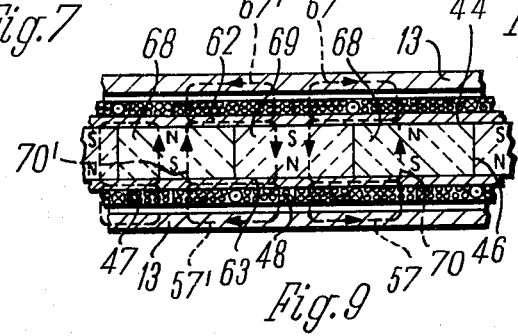
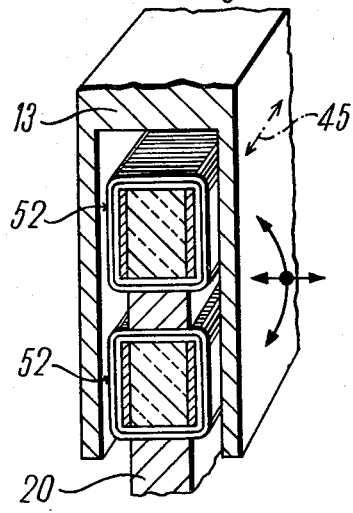

MAGNETIC BEARINGS

The invention relates to a magnetic bearing for supporting a body by applying a controllable magnetic field to the body.

In U.S. Pat. No. 3,112,962 there is described a magnetic bearing for journalling a body at a radial plane. (The present invention however is not limited to radial bearings). This known bearing comprises a plurality of permanent horseshoe magnets disposed about a ferromagnetic rotor or a ferromagnetic rotor portion. Each horseshoe magnet carries an electrical winding for strengthening or weakening the magnetic field applied to the rotor to regulate the position of the rotor. The ring of horseshoe magnets presents a ring of alternating magnetic poles to the rotor and rotation of the rotor therefore causes substantial losses due to reversals of the direction of magnetization of the rotor. Also the magnetic reluctance of the flux path of the electrically produced magnetic field is extremely high because the flux paths for the permanent magnetic and the electromagnetic fields are the same. Thus the electromagnetic field is conducted, with the exception of the body to be journalled, exclusively through media having high reluctance because permanent magnetic material in the stable range of its magnetizing characteristic has a low permeability ($\mu_R$ of the order of unity). Thus a very high electromagnetic coupling (Ampere-turns) is required to produce the necessary regulating forces. Increasing the amplitude of the electromagnetic regulating fields can also lead to demagnetization of the permanent magnets.

According to the present invention, a magnetic bearing for a body at least a portion of which is ferromagnetic, comprises at least one permanent magnet for producing a magnetic field along a first flux path and an electromagnet winding for producing a magnetic field along a second flux path, whereby a controllable magnetic field is applied to said ferromagnetic body or portion thereof, the ferromagnetic part of the bearing through which the electromagnetic flux path passes offering a high permeability to the magnetic filed produced by said electromagnet winding.

Thus the permanent magnetic and the electromagnetic flux paths are at least partly separated and can be arranged partly parallel to one another in the same or opposing directions. The ferromagnetic material in the electromagnetic flux path has high permeability which is necessary for a low reluctance thus leading to a saving on regulating energy. The permanent magnetic premagnetization exerts very high attractive forces on the body in relation to the electrical energy. The regulating field is preferably superimposed on the premagnetization in the air gap. The effect is thus utilized that the attractive force varies as the square of the magnetic induction B. From theoretical considerations, ignoring fringe effects, the force raising effect of the premagnetization can be appreciated from the following examples. It is first assumed that a permanent magnetic field with an induction having the arbitrary value 10 prevails in the air gap. An electromagnetically produced regulating field of the value 2, to the same scale, is superimposed on the permanent magnetic field. When both fields are in the same direction the resulting inductions in the air gap is 12 whereas the resulting induction is 8 when the fields are opposed. The resulting forces are proportional to the square of the induction i.e. they have the values 144 and 64, the difference between which is 80.

If a regulating field of ±2 had been used without premagnetization a force of the value of 4 would have been obtained. Thus with a given current rating in a given magnetic winding the obtainable force is increased by utilizing premagnetization. The premagnetization does not require the continuous consumption of energy, so that for a given use of electrical energy greater magnetic field energizes and attractive forces can be achieved.

In some embodiments, the first and second flux paths both extend through the gap or gaps between the body and the bearing where they are substantially parallel to one another and commonly situated.

Thus the two flux paths which are separated in the bearing are substantially united in the air gap and are completed through the body to be supported.

Advantageously two gaps through which magnetic fields pass and which act oppositely to one another are provided between the body and the bearing, whereby different strength magnetic forces may be applied to the body. In this way it is necessary to provide only a single element with but one winding in order to produce forces in two directions, i.e. a translatory degree of freedom is completely actively determined.

In other embodiments of the invention, the permanent magnetic flux path is completed through two ferromagnetic parts which are thereby at least partly magnetized into their region of magnetic saturation, which ferromagnetic parts lie at the same time in the electromagnetic flux path, the field of the electromagnetic winding being in the same direction as that of the permanent magnet or magnets in one ferromagnetic part but in the opposite direction to that of the permanent magnet or magnets in the other ferromagnetic part.

Preferably, the permanent magnetic flux path contains at least two permanent magnets arranged side-by-side with unlike poles next to one another and two ferromagnetic parts overlying the pole faces. The magnetic field produced in the two ferromagnetic parts by the oppositely directed side-by-side magnets saturates these parts. The electro-magnetic field is added to the permanent magnetic field in one of the two parts and subtracted in the other part. Thus one part is driven further into saturation whilst the other is operated out of saturation. In the first part the magnetic conductivity is very low (the reluctance is very high) whilst the opposite is the case for the other part. The latter remains in the range of ferromagnetism. Corresponding changes take place in the magnetic field produced by the electrical current in the winding so that correspondingly lower or higher field strengths prevail in the adjacent air gaps.

The invention will now be futher described, by way of example, with reference to the accompanying drawings, in which:-

FIGS. 7 and 8 are schematic perspective sectional views of two further embodiments of linear bearings;

FIG. 9 is a detail cross-section on the line IX—IX of FIG. 8;

FIG. 10 is a schematic perspective sectional view of a linear bearing which permits stabilisation in the presence of a rotary degree of freedom;

Figure 1:
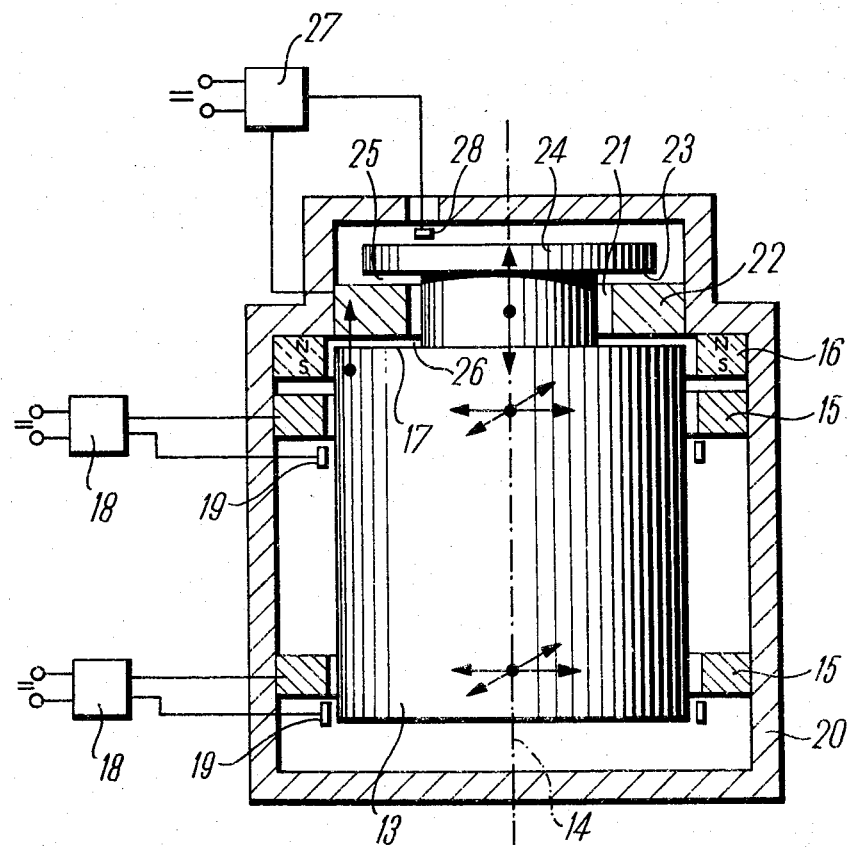
FIG. 1 is a schematic longitudinal sectional view of a contactless magnetic bearing system for a rotating body.

In the drawings the various embodiments of bearings in accordance with the invention are illustrated only schematically, but sufficiently clearly to enable the invention to be understood by those skilled in the art. The degree or degrees of freedom limited by each bearing are indicated by arrows. The current conducting directions of the individual windings (illustrated only diagrammatically) are indicated by a dot in a circle (arrow-head) or by a cross in a circle (arrow-tail). Furthermore, the magnetic flux path or the magnetic lines of force are indicated by dash-dot lines. The directions of magnetisation of the permanent magnets are indicated by their poles (N, S).

In FIG. 1 is illustrated a body 13 in the form of a rotor journalled about a vertical rotary axis 14. It is journalled without contact by means of a magnetic bearing system which comprises two radial bearings 15 surrounding the upper and lower parts of the rotor 13 and an axial stabilising magnet 16. Such a bearing system is shown in U.S. Pat. No. 3,650,581. Correspondingly thereto, the axial stabilising magnet comprises an annular permanent magnet which, in cooperation with an edge 17 of the ferromagnetic rotor brings about an axially stable, but radially unstable, support for the rotor. To oppose the destabilising influence, as well as all other radial forces and oscillations operating on the radial bearing 15, which is constructed as electromagnetic means, regulated forces are applied to the rotor in two horizontal degrees of freedom as indicated in the drawing. For this purpose, the electromagnetic means are provided with output signals from a controller 18 which generates these output signals in dependence upon sensor signals which are in turn produced by sensors 19 in response to changes in the spacing of these sensors from the rotor. The controller 18 is a d.c. controller and comprises an amplifier and a phase displacer whose output signals are advanced in phase with respect to time by a certain amount with respect to the sensor signals, which amount normally lies between zero and a quarter of the oscillation period of the sensor signals.

The radial bearing 15 and the axial stabilising magnet 16 are generally secured to, or part of, a stator 20 or other fixed part illustrated as a housing.

The upper end 24 of the rotor 13 is provided with an annular groove 21 into which a bearing element 22 extends. This bearing element 22 in the present case is constructed as an axial bearing element and can have, for example, the individual features shown in FIG. 12, to be described later. The bearing element 22 produces a regulated magnetic field in two air gaps 25 and 26 formed between the edge 17 and the bearing element 22, and between the upper surface 23 of the groove 21 and the bearing element 22, and serves to hold the rotor with exact precision in axial position. It is to be noted that the rotor 13 is to be held in an axially stable position by the axial stabilising magnet 16 so that with the present bearing system with a vertical rotary axis the weight forces are opposed by corresponding counter-forces. Also, the axial damping energy due to eddy currents and hysteresis losses, which occur in most cases when the axial position is not so exactly maintained, does not produce any substantially varying forces in this direction. The axial bearing element 22 is thus provided in order to obtain exact axial position of the rotor. As already mentioned, this bearing applies a regulated magnetic field. In general, an active regulated magnetic field will be provided, that is, a magnetic field regulated automatically according to position. However, it is also possible for the bearing element 22 to be readily after-adjustable by means of a few additional measures in that, for example, an after-regulation of the axial bearing can be obtained by hand.

Active regulation is provided in the embodiment of FIG. 1. For this purpose a controller 27 is connected to the bearing element 22 and essentially corresponds to the already described controllers 18. The controller 27 is supplied with sensor signals from a sensor 28 which has a contactless proximity detector disposed on the stator 20. The sensor 28 converts displacement of the rotor from its desired axial position into sensor signals. It can, for example, be an inductive, capacitive or photoelectric sensor. The use of galvanomagnetic constructional elements is also possible.

The controller 27 is a d.c. controller and contains an amplifier and a phase displacer. The sensor signals are converted in the controller 27 into output signals which are advanced in phase relative to the sensor signals by an amount between zero and a quarter of the oscillation period of the sensor signals. The output signals are d.c. signals, that is, the fluctuations in current or voltage amplitude are simply caused by displacements or oscillations of the rotor. No carrier frequency is used. This kind of regulation, which is also used by the radial bearings 15, has a great advantage that the losses due to the magnetic flux reversals in the rotor are reduced. It is thus possible for the rotor to be made out of any desired ferromagnetic material, for example, ordinary steel. The use of rotor laminations or other measures for minimising losses due to magnetic field reversal is generally not necessary.

The application of the output signals by the controller 27 to the bearing elements produces magnetic fields operating on the rotor, and thus applies forces to the rotor. These forces can be divided into two components, namely a compensating force component which is in phase with the sensor signals and serves for returning the rotor towards its desired position in response to rotor displacement from that position, and a damping force component which damps oscillations of the rotor and is phase advanced relative to the sensor signals by a quarter of the oscillation period relative to the sensor signals.

Reference will now be made to the axial bearing element 22 shown in FIG. 2 of the drawings. The rotor 13 (only partly illustrated) is provided with a peripheral collar 29 whose upper and lower surfaces 30 and 31 limit upper and lower air gaps 25 and 26 respectively. The fixed surfaces of the air gaps are formed on an annular non-rotating ferromagnetic part 32 formed of a material with high permeability ($\mu_R = 1000$). The material may, for example, be iron or steel of suitable quality, highly permeable compressed material or, in special cases, individual sheets (dynamo sheet) electrically insulated from one another. The important thing in each case is for the part 32 to have good magnetic conductivity. Within such considerations, the choise of material will depend upon the use of the apparatus which is fitted with the bearing system.

In the above embodiment of the invention the part 32 is substantially annular with a U-shaped cross-section providing an internal groove. Thus, the part 32 is formed of a core 33 in the form of an external ring, and shanks adjoining this ring and forming poles 34 and 35. These poles at the same time provide the fixed surfaces defining the air gaps 25 and 26. The part 32 is secured to the stator 20 (only a detail of which is illustrated). The radial bearings for the rotor 13 can be as illustrated in FIG. 1.

An electrical winding 36 is provided on the core 33 and in the illustrated embodiment is provided internally and externally of the core 33 so as to completely embrace the part 32. It will be appreciated that the winding 36 may take various forms in that it may, for example, be provided only internally or only externally of the core 33, or may be provided in the form of individual coils. Whatever form of winding is used, however, it must produce in the core 33 a variable magnetic field whose lines of force pass from one pole to the other. The path of these lines of force is hereinafter referred to as the electromagnetic flux path 37 and is shown in the drawings by dash-dot lines. Arrows indicate the direction of the lines of force. The winding 36 is connected to the controller 27 by means not shown. Also, for the sake of clarity, the associated sensor 28 is not shown in FIG. 2. It can cooperate with any desired part of the rotor in order to determine its axial position. The electromagnetic flux path 37 passes through the core 33 and is completed through the poles 34, 35, the air gaps 25, 26 and the ferromagnetic collar 29.

It is to be noted that if only the electromagnetic flux path 37 were provided the magnetic fields in the two air gaps 25, 26 would be of substantially the same size so that equal, but opposed, attractive forces would be applied between the ferromagnetic, but not permanent magnetic, collar 29 and the poles 34, 35. In this case regulation of the bearing would not be possible.

Permanent magnets 38, 39 are arranged in the axial direction outside the poles 34, 35. They comprise annular magnets of ferrite compressed material and are axially polarised. Each produces a respective magnetic field along a respective magnetic flux path 40, 41 whose approximate line and direction are likewise indicated by dash-dot lines and by arrows. The flux paths 37, 40, 41 are closed flux paths and in the illustrated embodiment are somewhat toroidal in shape.

The permanent magnets 38, 39 are so arranged that like magnet poles face the poles 34, 35; in the illustrated embodiment the North magnetic poles. The permanent magnetic field is such that the premagnetisation field symbolised by the magnetic flux path 40 is strengthened in the upper air gap 25 when electrical current is applied to the winding 36 of the electromagnetic flux path 37 in the direction or orientation indicated in FIG. 2. In other words, the electromagnetic flux path 37 is superimposed upon the permanent magnetic flux path 41 so that an increased attractive force in the air gap 25, and a decreased attractive force in the air gap 26, are exerted upon the rotor so that the rotor is drawn upwards. When the direction of current flow in the winding 36 is reversed the opposite affect is achieved, that is, the premagnetisation field in the air gap 26 is strengthened and that in the air gap 25 is weakened. Thus, active control of the position of the rotor is possible by means of the bearing 22. It is to be noted that the bearing 22 need only be provided with a relatively small quantity of energy for control or regulating purposes. For one reason it is not necessary that the winding 36 be supplied with a constant bias current whose amplitude is regulated, rather an energy saving regulation by current reversal is not only possible, but advantageous. Nevertheless, regulation by means of a bias current is possible whereby it is possible to adjust the load carrying capacity of the bearing. Energy can be saved, however, if this function is performed by means of a permanent magnet. It is further to be noted that the arrangement of two permanent magnets naturally has a destabilising effect upon the axial position of the rotor. However, by the use of active regulation this destabilising influence can be substantially neutralised so that, rather surprisingly, no negative phenomena take place. Above all, it is to be noted that the electromagnetic flux path 37 has a minimum magnetic reluctance in that it is composed almost entirely of the high permeability part 32 and the likewise ferromagnetic rotor part 29 also of high permeability. The magnetic flux easily bridges the air gaps 25, 26 which in the drawing have been grossly exaggerated. It may also be noted that with this kind of regulation the air gaps could be much larger than those in known magnetic bearings without substantial disadvantage. The permanent magnetic flux path 40 is substantially completely separated from the magnetic flux path 37. Both flux paths can simply run parallel to one another in the air gaps 25, 26 so that mutual strengthening or weakening is possible. The lower permeability of the material of the permanent magnets 38, 39 does not have any disadvantageous influence upon the electromagnetic flux path 37. There is also no tendency for the permanent magnets 38, 39 to be demagnetised by greatly and strongly alternating magnetic fields in the flux path 37.

Figure 2:
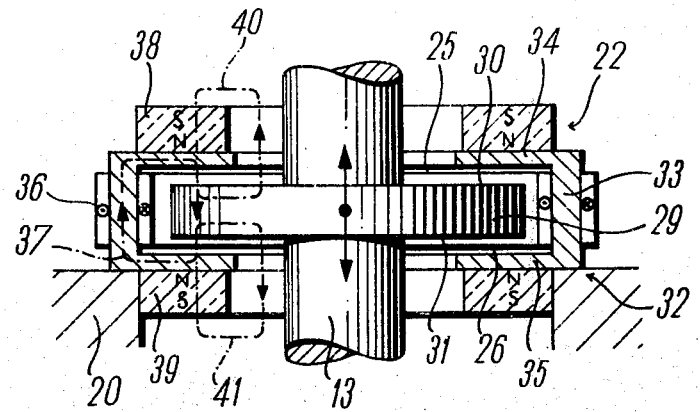
FIG. 2 is a schematic axial section of the magnetic axial bearing according to one embodiment of the invention.
Figures 3, 4:
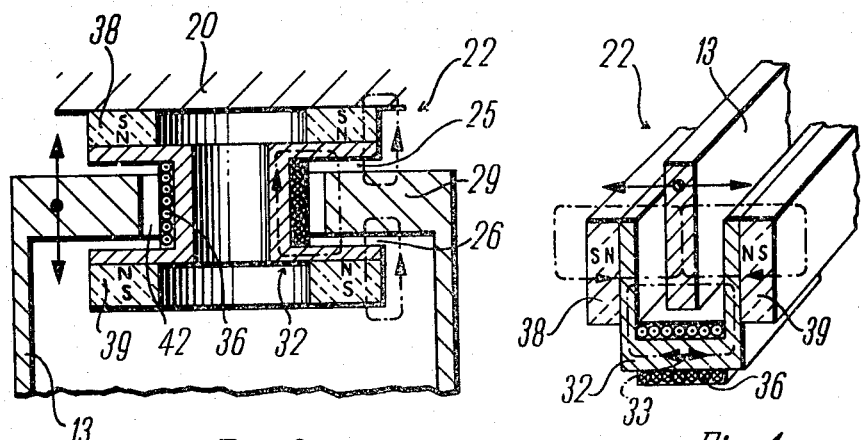
FIG. 3 is a schematic longitudinal section of another embodiment of magnetic axial bearing.
FIG. 4 is a schematic perspective sectional view of a linear bearing in accordance with the invention.

The bearing 22 illustrated in FIG. 3 is in basic construction and operation similar to that of FIG. 2 and does not, therefore, require further detailed description. Parts of the embodiment of FIG. 3 like those of FIG. 2 are indicated by like references. The rotor 13 is provided with a collar 29 which in this embodiment is inwardly directed. Correspondingly, the part 32 has the shape of a spool, that is, it is annular with a U-shaped cross-section to define an external groove 42. The winding 36 is wound about the core of the spool. The bearing 22 is fixed from above and the collar 29 on the rotor extends into the groove 42.

FIG. 4 of the drawings illustrates the same principle in connection with a linear bearing. The part 32 in this case has the form of an elongated rail of U-shaped cross-section. The core 33 forming the base of the U-shaped cross-section carries the current conducting winding 36. The permanent magnets 38, 39 are likewise elongated and are in the form of strips. The rotor 13 in this embodiment also has the shape of a strip or rail and extends into the U-shaped cross-section part 32. The whole bearing system has a certain length depending upon the relationships. The winding 36 can have an elongated oval shape.

It is to be noted that the bearing illustrated in FIG. 4 makes possible stabilisation in a horizontal degree of freedom as indicated in the drawing in both orientations to the left and right. For this purpose sensors have to be arranged in this direction between fixed and movable parts. If the body 13 is so long that it can extend between at least two separate bearings of the kind shown in FIG. 4, then by varying regulation of these two bearings 22 stabilisation in a rotary degree of freedom about an axis which is vertical in FIG. 4 is possible. It is also to be noted that with a linear bearing and with a rotary bearing the rotary and stationary parts may be interchanged. Thus, the bearing 22 could be the movable part whilst the body 13 is fixed.

Figure 5:
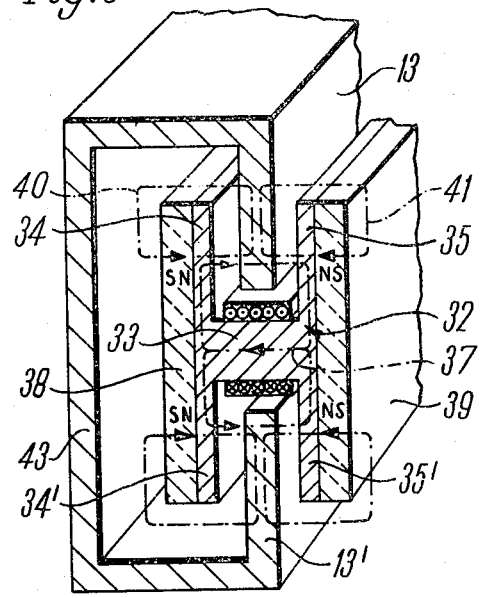
FIG. 5 is a perspective sectional view of another embodiment of linear bearing.

FIG. 5 shows a "doubled-up" form of the embodiment of FIG. 4 in that the part 32 is not U-shaped in section, but H-shaped. The core 33 is thereby formed by the web whilst the poles 34, 34' and 35, 35' are formed by the flanges. The permanent magnets 38, 39 are each in the form of a broad plate disposed on the whole of the outside of the respective flange. Nevertheless, they could be formed as separate strips each covering a respective pole. A respective body portion 13, 13' is arranged in the groove between the poles 34, 35 or 34', 35' and such portions may be joined together to form a C-shaped rail 43.

The advantages of the embodiments of linear bearings shown in FIGS. 4 and 5 are substantially the same as those of the axial bearings of FIGS. 2 and 3 or other conceivable possibilities of use. In each case the controllable field can be readily superimposed upon the homogeneous premagnetisation field in the peripheral direction or direction of movement. Thus, hardly any loss due to reversal of magnetisation which could have a braking or warming influence on the rotor 13 takes place. In all cases the construction is especially simple and the use of the electrical regulating energy and likewise of the permanent magnetic material is very economical.

Figure 6:
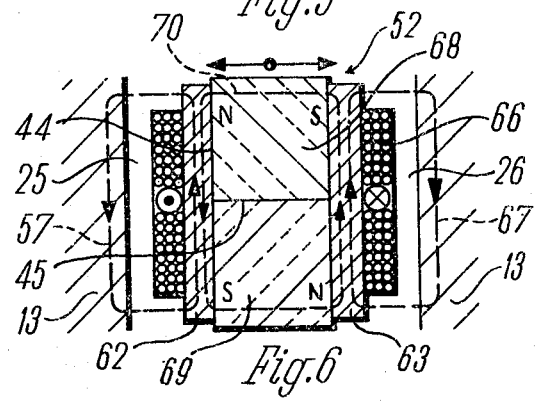
FIG. 6 is a schematic detail section for explaining the mode of operation of other magnetic bearings of the invention.

The embodiments of FIGS. 6 to 12 are constructed in accordance with similar principles with at least two magnetic flux paths separate from one another. FIG. 6 illustrates the mode of operation of the embodiments of FIGS. 7 to 12. In FIG. 6 two sections of the ferromagnetic body 13 separated from one another are shown. These sections respectively define the air gaps 25, 26. The bearing 52 comprises permanent magnets 68, 69 of which two are shown in FIG. 6. They are arranged side-by-side with their pole faces 44 lying in common planes, but with unlike poles adjacent one another. The magnetic axes of the permanent magnets 68, 69 are, therefore, parallel to one another, but in opposite directions.

The pole faces 44 of the permanent magnets 68, 69 are covered by ferromagnetic parts 62, 63 of one of the materials mentioned previously in connection with the part 32. These parts 62, 63 are shown as being constructed of conductive sheet of relatively small cross-section so that the magnetic field in the permanent magnetic flux path 70, which is completed through the permanent magnet 68, the part 62, the permanent magnet 69 and the part 63, magnetises the parts 62, 63 substantially into their region of magnetic saturation. This saturation is at its maximum at the point adjacent the two surfaces 45 by which the magnets 68 and 69 lie against one another. The magnetic flux should be sufficiently strong for the parts 62, 63 to be magnetised beyond saturation by an electromagnetic field superimposed upon the permanent magnetic field in the parts 62, 63. A winding 66 can be arranged in various ways. The important thing is for the winding 66 to be able to readily produce an electromagnetic field in the unit comprising the permanent magnets and ferromagnetic parts with the electromagnetic field parallel to the permanent magnetic field. The electromagnetic flux paths 57 and 67 are indicated in FIG. 6. It is to be noted that in the embodiment as illustrated in FIG. 6, the lines of force in the flux paths 57 and 70 are parallel to one another, but in opposing directions in the part 62 whilst the lines of force in the corresponding flux paths 67 and 70 are likewise parallel to one another, but in the same direction in the part 63. By this means the part 62 is brought into a magnetic state in a region below magnetic saturation whereas the magnetic field strength in the part 63 is raised above the saturation field strength produced by the permanent magnetic magnetisation. The magnetic conductivity of this part 63 is, therefore, very low (the permeability to the electromagnetic flux is almost equal to that of a vacuum, that is, $\mu_R$ is approximately equal to unity). The magnetic flux produced in the conductive plate 63 by the winding 66 is, therefore, very low, and that produced by the winding in the conductive plate 63 is very high, that is, in the region of that of ferromagnetic material with a permeability of $\mu_R$ approximately equal to one thousand. Due to the relatively small magnetic reluctance of the conductive plate 62, the field strength in this plate due to the electromagnetic excitation by the winding 66 is very high, and correspondingly the magnetic field strength in the adjoining air gap 25 is also high. The electromagnetic flux path 57 is completed through the body 13. The attractive force in the region of the air gap 25 is, therefore, substantially higher than that in the air gap 26. By reversing the flow of current through the winding 66 the opposite effect can be achieved.

It is to be noted that also in this case the force raising and energy saving effects due to the premagnetisation can also be used. By raising the permanent premagnetisation above saturation the premagnetisation permanent magnetic field is extended into the air gaps so that the electromagnetic flux path can be superimposed upon the permanent magnetic flux path in these air gaps as described previously. Also in this case the fields can be strengthened or weakened in opposition to one another in the desired manner. The premagnetisation through the separate permanent magnetic flux path 70 also has two functions. Firstly, it serves to magnetise the conductive plates 62, 63 into their region of saturation which is necessary for the operation of this embodiment. Secondly, it serves to create a permanent premagnetisation in the air gap which leads to the previously mentioned saving in control energy.

The bearing 52 shown in FIG. 7 of the drawings serves as a linear bearing. A rail-like elongated body 13 has a U-shaped cross-section defining a groove in which the bearing 52 is arranged. The two permanent magnets 68, 69 are arranged one above the other, but poled in opposite directions, that is, they are arranged parallel to the direction of movement 45 as indicated by the dash-dot double arrow. The surfaces 46 by which the permanent magnets 68, 69 abut one another are substantially parallel to the direction of movement 45. The ferromagnetic parts 62, 63 cover the laterally arranged pole faces of the permanent magnets and are provided with the winding 66 exteriorly. In this case the winding 66 limits the possible unbroken length of the bearing 52. It should be noted that in this case no variation or hardly any alternation of the magnetic fields takes place in the direction of movement 45. The field is substantially homogeneous so that the hysteresis and eddy current losses in the body 13 are very low.

The embodiment shown in FIGS. 8 and 9 can be very simply constructed. It can be seen that permanent magnets 68 and 69 are arranged side-by-side one after the other in the direction of movement 45, the direction of magnetisation being horizontal, but adjacent magnets being polarised in opposite directions. Thus, the bearing 52 can comprise numerous magnets 68, 69 arranged one after the other. Two strip-like ferromagnetic parts 62, 63 cover the pole faces 44 of the magnets. Contrary to the winding arrangement of FIG. 7, the winding 66 of FIGS. 8 and 9 is annular and is disposed about the parts 62 and 63 and the permanent magnets 68 and 69 sandwiched therebetween, so that the winding is, in effect, in the form of a long spiral whose axis extends in the direction of movement 45. The winding 66 is separated or connected in sections 47, 48 as can be seen in FIG. 9. Adjoining sections 47, 48 are wound in opposite directions. Each winding section 47, 48 is symmetrically arranged about the plane in which the abutting surfaces 46 of adjoining magnets 68, 69 abut one another transversely to the direction of movement 45.

The reason for the differeing current conducting directions in the winding 66 can be seen from FIG. 9 wherein the individual magnetic flux paths 57, 57', 67, 67' are indicated. Because of the alternating direction of the permanent magnetic flux paths, the electromagnetic flux paths must likewise be alternated in direction in order to obtain a uniform bearing action.

Whereas in FIG. 7 the lines of force in the body 13 are substantially perpendicular to its direction of movement 45, in that they, for example, enter the body near the top thereof and again enter the bearing element 52 adjacent the ends of the shanks of the body 13, in the embodiment of FIGS. 8 and 9 the lines of force enter and leave the body at points longitudinally spaced in the direction of movement 45. Thus, the magnetic field is alternated at each coil section 47, 48, so that when movement takes place losses due to magnetic reversal occur in the body 13. The embodiment of FIGS. 8 and 9, therefore, is only to be preferred if such losses become unimportant, for example, when the movements are slow or the magnetic forces are small.

FIG. 10 illustrates an embodiment which differs from that of FIGS. 8 and 9 simply in that the longitudinal groove formed in the rail-like body 13 is deeper, so as to receive two substantially identical bearings 52. With such an arrangement it is possible, by providing two bearings 52 with separate controllers and sensors, to controllably support the body in a horizontal translatory degree of freedom and in a rotary degree of freedom about an axis in the direction of movement 45.

Figure 11:
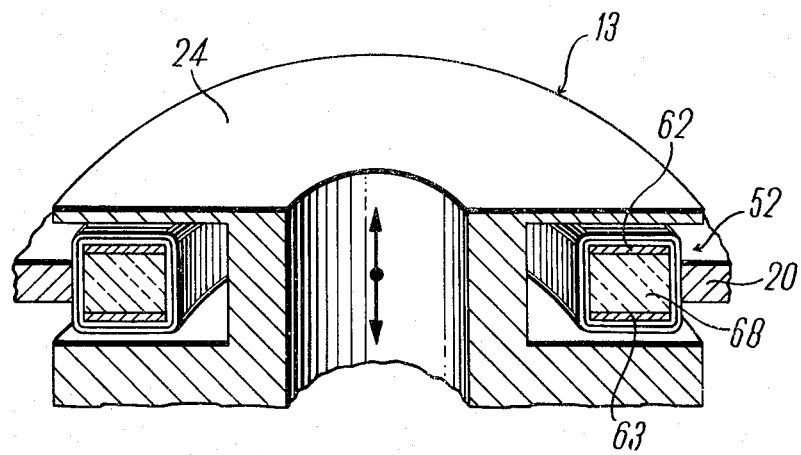
FIG. 11 is a perspective sectional detail of another embodiment of axial bearing.
Figure 12:
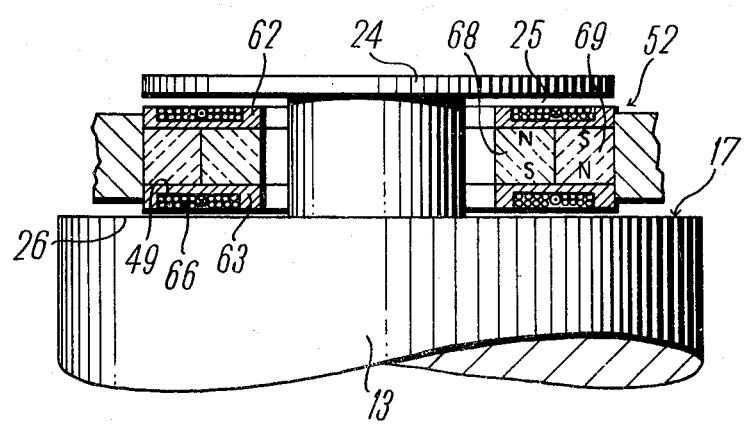
FIG. 12 is a longitudinal section of a further embodiment of axial bearing.

The embodiments shown in FIGS. 7 to 10 are linear bearings operating upon the principles described with reference to FIG. 6. A further use of this principle is shown in FIGS. 11 and 12 which illustrate axial bearings for a rotatable body. The embodiment of FIG. 11 employs permanent magnets 68, 69 arranged one after the other similarly to the embodiment of FIGS. 8 and 9, but in a circle rather than in a straight line. As with the embodiment of FIGS. 8 and 9, the axial bearing of FIG. 11 is generally only to be preferred for slow rotary movements. The bearing shown in FIG. 12 is constructed similarly to that of FIG. 7. The permanent magnets comprise two concentric rings arranged one within the other, but polarised in opposite axial directions. The ferromagnetic parts 62, 63 this time in the form of hollow discs, lie against the end faces of the permanent magnets 68, 69. In the embodiment of FIG. 12 the disc-like parts 62, 63 have a shallow U-shaped cross-section to form channels 49 in which the annular or spiral winding 66 lies. The shape of the parts 62, 63 illustrated in FIG. 12 makes possible smaller air gaps and the shanks of the shallow U-shaped cross-section effectively operate as pole shoes. In this axial bearing the magnetic fields in the air gaps 25, 26 are homogeneous, that is, upon rotation of the rotor the magnetic field variations are substantially only those due to control influences. The strong premagnetisation field of the permanent magnets is completely rotary symmetrical so that no losses due to magnetic reversal take place. The construction of the rotors shown in FIGS. 11 and 12 is substantially as described above with reference to FIG. 1.

Thus, there is provided a bearing for magnetic bearing systems which is of simple construction and possesses relatively uncomplicated electrical parts. The bearing possesses good reliability and operating safety. The bearing is especially suitable as an axial bearing wherein it is advantageous that the axial forces can be applied in both axial directions at a single point in the rotor. The control in both directions is possible by means of just one bearing with one winding. With such a possibility very homogeneous magnetic fields can be produced without taking any special steps in connection with the rotor, and in particular with the material of the rotor. Also, no close limitations are placed upon the shape of the rotor. The rotor can be constructed free of permanent magnets which not only would add additional weight, but would also reduce the rotary speed limit of the rotor. By a suitable arrangement or construction of the controllers, and by a suitable choice of premagnetisation return forces, damping and spring or suspension stiffness can be varied over wide limits. Electrical axial adjustment as accurate as mechanical adjustment is obtainable. The ratio of useful inductivity to stray inductivity is very high, which is of specially great advantage for linear bearings in comparison with previously known linear bearings. Whilst the invention has been described in relation to bearing systems providing completely contact-free support of moving bodies, the bearing of the present invention can also be used in bearing systems which are not completely free of mechanical contact.

Although individual magnets in the magnetic flux paths have been shown and described, it is also possible to utilise a combined magnet body which is so magnetised as to effectively form two or more oppositely poled magnets arranged side-by-side.

Figure 13:
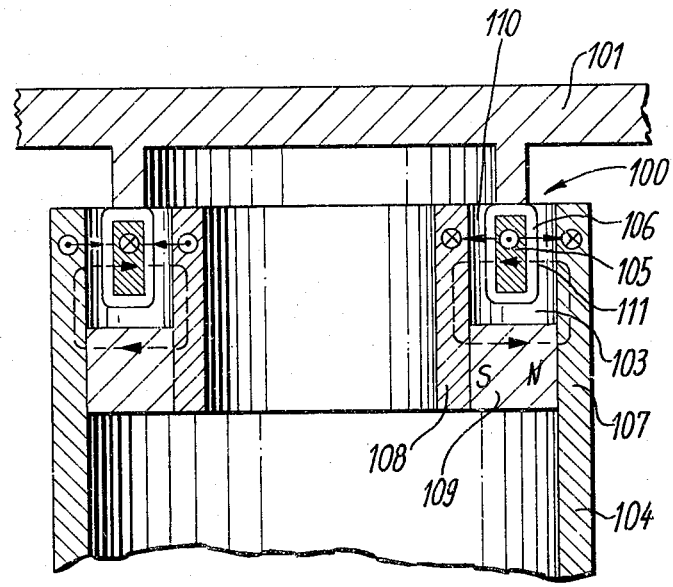
FIG. 13 is a detail sectional view of yet another embodiment of the invention.

FIG. 13 of the drawings illustrates an embodiment of the invention which comprises a radial bearing 100 which is magnetically actively controllable. The bearing of FIG. 13 is fixed to a stator 101 and is received in an annular groove 103 formed in the upper end face of a rotor 104. The bearing comprises an annular ferromagnetic core 105 and a spiral winding 106 coiled above the core. As with other embodiments, the axial length of the core 100 is larger than its radial thickness. The coiled or toroidal winding may, for example, comprise four parts, each occupying a quarter of the circumference of the core 105. The coils into which the winding is thus separated or divided are connected to a corresponding controller. Such an arrangement is described more fully in our co-pending U.S. Pat. application No. 342,148, entitled Improvements In or Relating to Electromagnetic Bearing Means, filed Mar. 16, 1973, and claiming priority from German Pat. application No. P 22 13 465.2.

An annular permanent magnet 109 which is radially magnetised is disposed between the outer ferromagnetic rotor wall 107 and an inner wall 108 on the rotor 104, which walls define between them the groove 103 with the magnet 109 forming the base of the groove. The walls 107 and 108 of the rotor 104 form not only a good mechanical support for the magnet, which may comprise weak ceramic magnetic materials, but also form pole shoes which conduct the magnetic field across the air gaps 110 and 111 between the rotor walls and the bearing 100, as indicated by broken lines and arrows by way of example. The magnetic circuit containing the permanent magnet 109 passes through both walls 107 and 108, the core 105 and the air gaps defined between the core and the inner and outer walls, and pass in the same direction through both air gaps. On the other hand, the magnetic flux produced by the winding 106 in the other magnetic flux path flows in opposite directions through the two air gaps at opposite sides of the rotor. Thus, the magnetic fields in the air gaps can be strengthened and weakened in opposite directions in order to apply a net force to the rotor to the left or to the right in order to control the rotor position.

It is an advantage of the invention that it is not imperative for the permanent magnetic parts to be disposed on the rotor. Normally, and especially with high rotor speeds, the mounting of permanent magnets on the rotor is a disadvantage because the magnetic material generally has a low mechanical strength. Also, the weight of the rotor is thereby increased. Nevertheless, in certain circumstances, for example when the speed is limited or the journalling of a heavy rotor is possible, the embodiment of FIG. 13 can introduce advantages. For example, the bearing 100 can be made thinner, in a radial direction, than the permanent magnet lying axially inwardly thereof. Therefore, the winding 106 can be made from a shorter length of wire whereby to reduce the ohmic resistance of the bearings. Furthermore, the annular magnet does not have to conform in shape to the bearing so that a larger volume of permanent magnetic material can be used without introducing constructive difficulties.

Embodiments in which the permanent magnets are mounted on rotors are not limited to the kind illustrated in FIG. 13. For example, one of the ferromagnetic wall parts 107 and 108 can be omitted. This dispenses with the doubled-up air gap, yet the mode of operation remains substantially the same.

We claim:

1. In a magnetic bearing for a body having a ferromagnetic portion: first means defining a first flux path; at least one permanent magnet in said first flux path and producing a magnetic field therein; second means defining a second flux path; said second flux path being non-coincident with said first path for a substantial portion of its length, a ferromagnetic part in said second flux path; an electromagnet winding for producing a magnetic field in said second flux path, said ferromagnetic part offering a high permeability to the last-mentioned magnetic field; and means for controlling electric current supplied to said winding to apply a controlled magnetic field to said ferromagnetic body portion.

2. A bearing according to claim 1 in which said second flux path does not pass through said permanent magnet.

3. A bearing according to claim 1 in which said control means is adapted to reverse the magnetic field in said second flux path.

4. A bearing according to claim 1 in which said body is rotatable and in which said bearing is an axial bearing, said control means being adapted to axially control said body.

5. A bearing according to claim 1 which is a linear bearing.

6. A bearing according to claim 1 in which said body and said bearing define two gaps therebetween, at least said second flux path including said flux paths, said gaps being effective in opposite directions, whereby different strength magnetic forces may be applied to said body.

7. A bearing according to claim 6 in which said two air gaps define planes parallel to one another.

8. A bearing according to claim 5 in which said first means defines two separate flux paths each with a permanent magnet therein, each of said two separate flux paths including a respective one of said two gaps.

9. A bearing according to claim 1 in which said body and said bearing define two gaps therebetween, said first and second flux paths each including portions in both of said gaps, which portions are substantially parallel to one another where they are commonly situated.

10. A bearing according to claim 1 in which said first means includes two ferromagnetic parts, the field of said permanent magnet at least partly magnetizing said ferromagnetic parts into their region of magnetic saturation, said second means also including said ferromagnetic parts, the field of said electromagnet winding being in the same direction as the field of said permanent magnet in one of said parts but in the opposite direction in the other of said parts.

11. A bearing according to claim 10 which includes at least two permanent magnets in said first flux path, said permanent magnets being disposed side-by-side with opposite poles adjacent one another.

12. A bearing according to claim 11 in which said permanent magnets are arranged next to one another in relation to the direction of movement of said body relative to said bearing.

13. A bearing according to claim 11 in which said ferromagnetic parts comprise plates arranged at opposite ends of said permanent magnets and on the pole faces of the latter.

14. A bearing according to claim 11 which includes a plurality of permanent magnets in said first flux path, said permanent magnets being arranged side-by-side with opposite poles next to one another, and in which said electromagnet winding is divided into sections, each of said winding sections being wound about a respective two adjoining permanent magnets approximately up to the centre thereof, adjacent winding sections being wound in opposite directions.

15. A bearing according to claim 10 in which said permanent magnet has a strength such that the magnetic field thereof penetrates into a gap defined between said ferromagnetic body portion and said bearing.

16. A bearing according to claim 1 which is operative in two directions and in which said second means defines but a single second flux path.

17. A bearing according to claim 11 in which said permanent magnets are comprised by at least one magnet body magnetized as to define two oppositely poled permanent magnets side-by-side.

18. A bearing according to claim 1 in which said permanent magnet is arranged on said body.

19. A bearing according to claim 1 which comprises a radial bearing.

* * * * *